United States Patent

Kappel et al.

Patent Number: 5,857,662
Date of Patent: Jan. 12, 1999

[54] ELECTROHYDRAULIC STOP DEVICE

[75] Inventors: Andreas Kappel; Randolf Mock, both of München; Hans Meixner, Haar, all of Germany

[73] Assignee: Siemens Aktiengesellschaft, Munich, Germany

[21] Appl. No.: 727,559
[22] PCT Filed: Apr. 13, 1995
[86] PCT No.: PCT/DE95/00518
§ 371 Date: Oct. 15, 1996
§ 102(e) Date: Oct. 15, 1996
[87] PCT Pub. No.: WO95/28592
PCT Pub. Date: Oct. 26, 1995

[30] Foreign Application Priority Data

Apr. 14, 1994 [DE] Germany .............................. 4412948.3

[51] Int. Cl.⁶ .............................. F16K 31/00; F02M 59/46
[52] U.S. Cl. ................. 251/129.06; 251/57; 137/625.65; 60/545
[58] Field of Search ................. 251/129.06, 57; 137/625.65; 60/545

[56] References Cited

U.S. PATENT DOCUMENTS

| 4,762,300 | 8/1988 | Inagaki et al. ........................ 251/57 X |
| 4,995,587 | 2/1991 | Alexius . |
| 5,129,489 | 7/1992 | Majima et al. ................ 251/129.06 X |
| 5,417,142 | 5/1995 | Lohmann ....................... 251/129.06 X |

FOREIGN PATENT DOCUMENTS

| 0 114 375 | 8/1984 | European Pat. Off. . |
| 0 198 233 | 10/1986 | European Pat. Off. . |
| 29 18 377 | 11/1980 | Germany . |
| 37 13 697 | 11/1988 | Germany . |
| 37 35 750 | 5/1989 | Germany . |
| 39 28 315 | 3/1990 | Germany . |

*Primary Examiner*—Kevin Lee
*Attorney, Agent, or Firm*—Hill & Simpson

[57] ABSTRACT

A electrohydraulic stop device contains a piezoelectric actuator (P) which acts on two coupled hydraulic stroke transformers having identical transmission ratios. Essential components of the stop device are the pressure piston (DK) driven by the actuator (P), the lifting piston (HK) mounted axially displaceably in a cylindrical bore (ZY) of the pressure piston (DK), and a chamber (KB), into which open inflow and outflow ducts (B2, G2, B3, G3) for the medium to be shut off. By activating the actuator (P), the dumbbell-shaped lifting piston (HK) can be displaced virtually without delay in the pressure piston bore (ZY) and the inflow or outflow ducts (B2, B3) be closed.

17 Claims, 8 Drawing Sheets

ELECTROHYDRAULIC STOP DEVICE

BACKGROUND OF THE INVENTION

1. Field of the Invention

The present invention relates generally to a shutoff and stop valve, in particular for fuel injection systems.

2. Description of the Related Art

In all areas of hydraulic control and regulation technology, stop and shutoff valves that switch quickly and without delay are required. The dynamic properties of fuel injection systems could also be improved considerably and their design simplified by means of quick-acting shutoff valves.

SUMMARY OF THE INVENTION

The aim of the present invention is the provision of an electrically activatable stop device which possesses very good dynamic properties. Moreover, the stop device is to have a compact design, work in an operationally reliable manner and be capable of being used within a wide temperature range. These objects are achieved, according to the invention, by means of electrohydraulic stop devices having the following features:

a) a first piston is arranged axially displaceably in a first bore of a first housing,
   a1) the first piston and the first bore forming a first and a second housing chamber, and
   a2) the first and the second housing chamber each being filled with a hydraulic medium;
b) an actuator, which is arranged in one of the housing chambers and the axial length of which can be changed controllably, acts on the first piston;
c) a dumbbell-shaped second piston is arranged axially displaceably in a second bore of the first piston,
   c1) the second piston acting on a return element arranged in the first housing,
   c2) the second piston and the second bore forming a third chamber filled with the hydraulic medium, and
   c3) the third chamber being connected to the second housing chamber;
d) the second piston and the second bore form a stop chamber, the stop chamber
   d1) being connected via a first piston duct to a housing inflow and via a second piston duct to a housing outflow, and
   d2) the first and the second piston duct opening into the stop chamber in such a way that the second piston shuts off one of the piston ducts in the event of a length change in the actuator.

In another embodiment, the stop device has the following features:

a) a first piston is arranged axially displaceably in a first bore of a first housing,
   a1) the first piston and the first bore forming a first and a second housing chamber, and
   a2) the first and the second housing chamber each being filled with a hydraulic medium;
b) an actuator, which is arranged in one of the housing chambers and the axial length of which can be changed controllably, acts on the first piston;
c) a dumbbell-shaped second piston is arranged axially displaceably in a second bore of a second housing,
   c1) the second piston and the second bore forming a third and fourth housing chamber each filled with the hydraulic medium, and
   c2) the second piston acting on a return element arranged in the second housing;
d) the housing chambers are connected to one another in such a way that an axial displacement of the first piston causes a displacement of the second piston;
e) the second piston and the second bore form a stop chamber;
f) a housing inflow and a housing outflow open into the stop chamber in such a way that the second piston shuts off the housing inflow or the housing outflow in the event of a length change of the actuator.

The invention makes it possible to construct stop valves which respond to an electrical activation signal virtually without delay and which also still work reliably at high actuation frequencies f>1 kHz. Their use in a diesel injection system allows exact and reproducible metering of even the smallest fuel quantities, since the opening and closing times of the stop valve are in the range of τ<0.1 ms. Moreover, the short stop times guarantee a specific structure and break-away of the fuel jet generated by the injection nozzle.

The preferred embodiments and developments of the invention provide that the first housing has a first and a second annular duct in the region of the side face of the first piston, and the first annular duct connects the first piston duct to the housing inflow and the second annular duct connects the second piston duct to the housing outflow.

In one embodiment, the first piston is arranged in the first housing in a rotationally fixed manner. A third piston duct may be connected to a second housing outflow opens into the stop chamber in such a way that said third piston duct is not shut off in the event of a displacement of the second piston. A fourth piston duct opening into the stop chamber is connected to a second housing inflow.

A second housing outflow opens into the stop chamber in such a way that said second housing outflow is not shut off in the event of displacement of the second piston. The first housing inflow is connected to a pressure-generating feed device. The housing inflow and the housing outflow are placed at different levels.

In one application, the second housing outflow is connected to an injection device. The second piston may be designed as a sealing valve. The end faces of the second piston are in each case smaller than the corresponding end faces of the first piston.

A capillary gap is present between the side faces of the first and/or of the second piston and the respective bore. A spring element is provided acting on the first piston. The first and/or second piston are installed in a sealed manner.

A piezoelectric, electrostrictive, magnetostrictive or electromagnetic actuator is provided. In addition, at least one of the housing chambers is connected to a pressure accumulator.

DETAILED DESCRIPTION OF THE PREFERRED EMBODIMENTS

Figure 1:
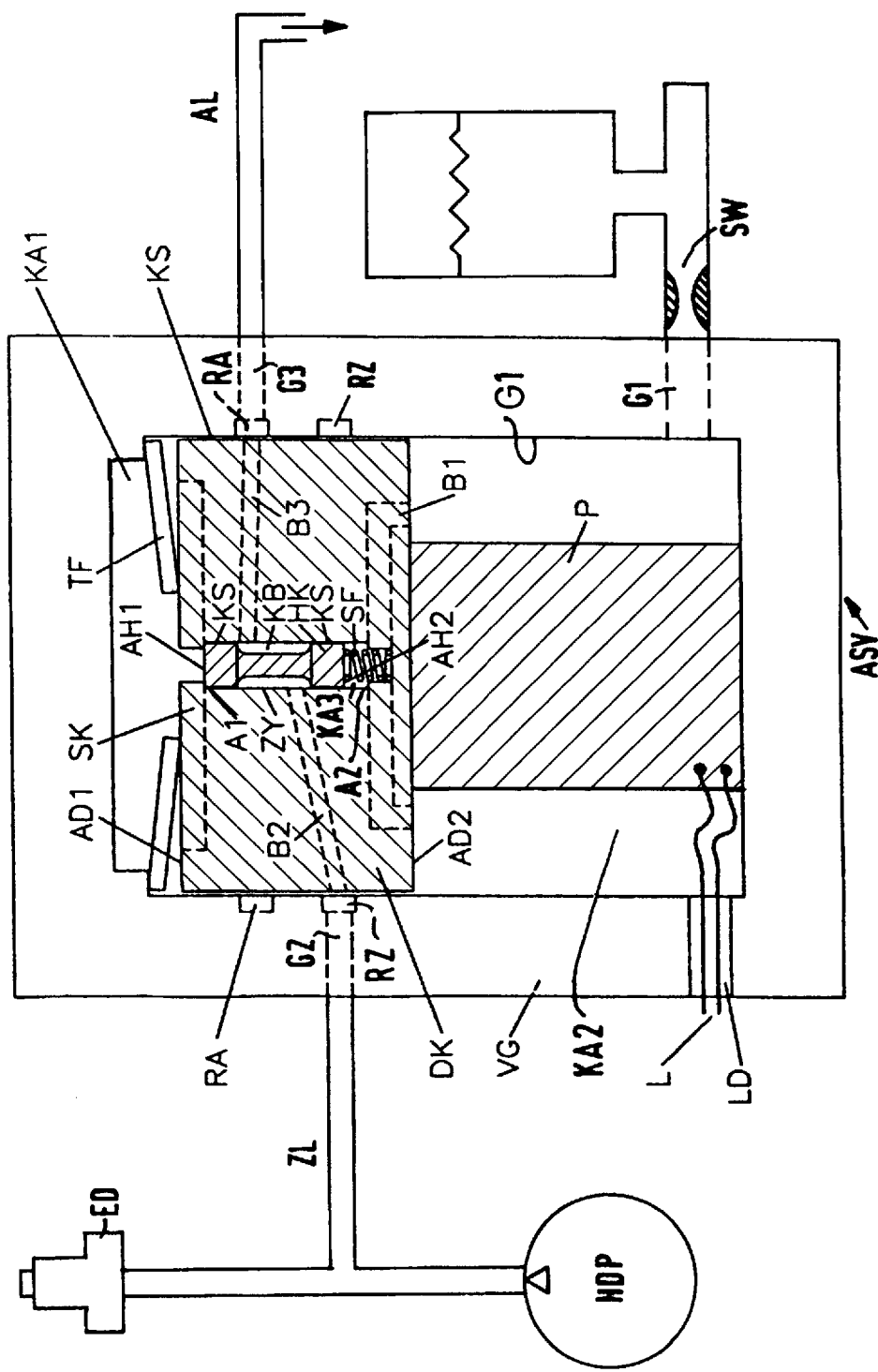
FIG. 1 is a schematic diagram which shows diagrammatically the design of a diesel injection system equipped with a stop valve according to the invention.

The injection system shown in FIG. 1 consists of a high pressure feed pump HDP, an injection nozzle ED, a shutoff valve ASV and a delivery conduit ZL connecting these components. The shutoff valve ASV has the task of abruptly interrupting the return flow of the diesel fuel, fed into a delivery conduit ZL by a feed pump HDP, to a tank (not shown) and of thereby initiating the injection operation. The shutoff valve ASV contains as a drive element an electromechanical actuator P which acts on a hydraulic stroke transformer DK/HK and which is supplied with the necessary operating voltages via a pressure-tight housing bushing LD. The electromechanical actuator P which is particularly appropriate is a piezoelectric multilayer stack which, even at moderate operating voltages, still generates comparatively large primary strokes (relative length change $\Delta l/l \approx 1 \times 10^{-3}$; drive force $F = 10^2$ to $10^5$ N).

Owing to the high mechanical rigidity of the piezoelectric sintered body, its electromechanical resonance is in the range of about 10 to 1000 kHz, so that response times of about 0.001 to 0.1 ms can be achieved in principle. However, the response times implemented in practice are greater and depend inter alia on the electrical activation and wiring of the piezoelectric stack and on the size of the masses driven by the actuator P. Since the electrical capacitance of the piezoelectric stack is typically in the range of about $C_p = 1$ to 100 $\mu$F and the internal resistance of the voltage source assigned to the actuator P amounts to about $R_i = 1$ ohm, values of about $\tau = 1$ to 100 $\mu$s are obtained for the charge time constant defined by $\tau = C_p \times R_i$. The response times of the piezoelectric actuator P are therefore around 1 to 2 orders of magnitude below those of comparable electromagnetic drives, and this, together with a compact valve design and small moved masses, allows extremely short stop times.

In order to initiate the injection of the fuel, fed by the pump HDP, into a combustion space (not shown), the actuator P is activated and is thereby elongated in the axial direction. The length change $\Delta l$ of the actuator P results in a corresponding upward displacement of the pressure piston DK mounted with a clearance fit in a cylindrical bore of a housing VG, so that an overpressure $P_1$ builds up in a chamber KA1 filled with a hydraulic medium and an underpressure $P_{2/3} < P_1$ builds up in chambers KA2 and KA3 likewise filled with the hydraulic medium and flow-connected to one another by means of a pressure piston bore B1. As soon as the hydraulic forces proportional to the pressure difference $\Delta P = P_1 - P_{2/3}$ exceed a value dependent on the rigidity and prestress force of a helical spring SF, a dumbbell-shaped lifting piston HK in a cylindrical pressure piston bore ZY moves downward away from the abutment A1, at the same time travels over a pressure piston bore B3 opening into an annular chamber KB and finally comes to rest on a lower abutment A2. Since the fuel can then no longer flow via a housing bore G2, connected to the delivery conduit ZL, and a pressure piston bore B2 into the chamber KB formed by the lifting piston HK and by the bore ZY and flow off from there via the duct or bore B3, a housing bore G3 and the outflow AL into the tank, such a high pressure finally builds up in the pump-side part of the system that the nozzle needle lifts off from its seat surface in the nozzle body and the injection operation commences. In this case, the injected fuel quantity can be controlled in a simple way by means of the closing duration of the pressure piston bore B3.

The injection operation is terminated by the electrical discharge of the piezoelectric actuator P supported on the housing bottom. As a consequence of the accompanying contraction of the actuator P, the pressure piston DK moves downward again under the constraint of the return force exerted by a strong cup spring TF. Assisted by the helical spring SF and the pressure difference existing between the chambers KA1 and KA2/KA3, the lifting piston HK executes an oppositely directed upward movement and exposes the bore B3 again, and the fuel can flow, unimpeded, back into the tank. The exposure of the pressure piston bore B3 results, in the pump-side part of the system, in such a pressure drop that the valve needle of the injection nozzle ED descends onto the sealing surface of the nozzle body again and closes the injection orifice.

The transient mode of operation of the drive makes it necessary to prestress the piezoelectric actuator P mechanically. The force necessary for this purpose is generated by the cup spring TF which is arranged in the chamber KA1 and which also assists the return of the pressure piston into its position of rest. So as not to impede the fluid exchange between the volume enclosed by the cup spring TF, by the outer region of the pressure piston surface AD1 and by the valve housing VG and the upper hydraulic chamber KA1, a pressure piston surface AD1 is provided with ducts SK.

In order to guarantee a connection of the annular chamber KB to the delivery conduit ZL or to the outflow AL, the connection being independent of the orientation of the pressure piston DK relative to the housing VG, the valve housing VG possesses two annular ducts RZ and RA in the region of the pressure piston sealing surface. These are arranged at different levels, in such a way that the housing bore G2 and the pressure piston bore B2 open into the lower annular duct RZ and the housing bore G3 and pressure piston bore B3 open into the annular duct RA.

Figure 2:
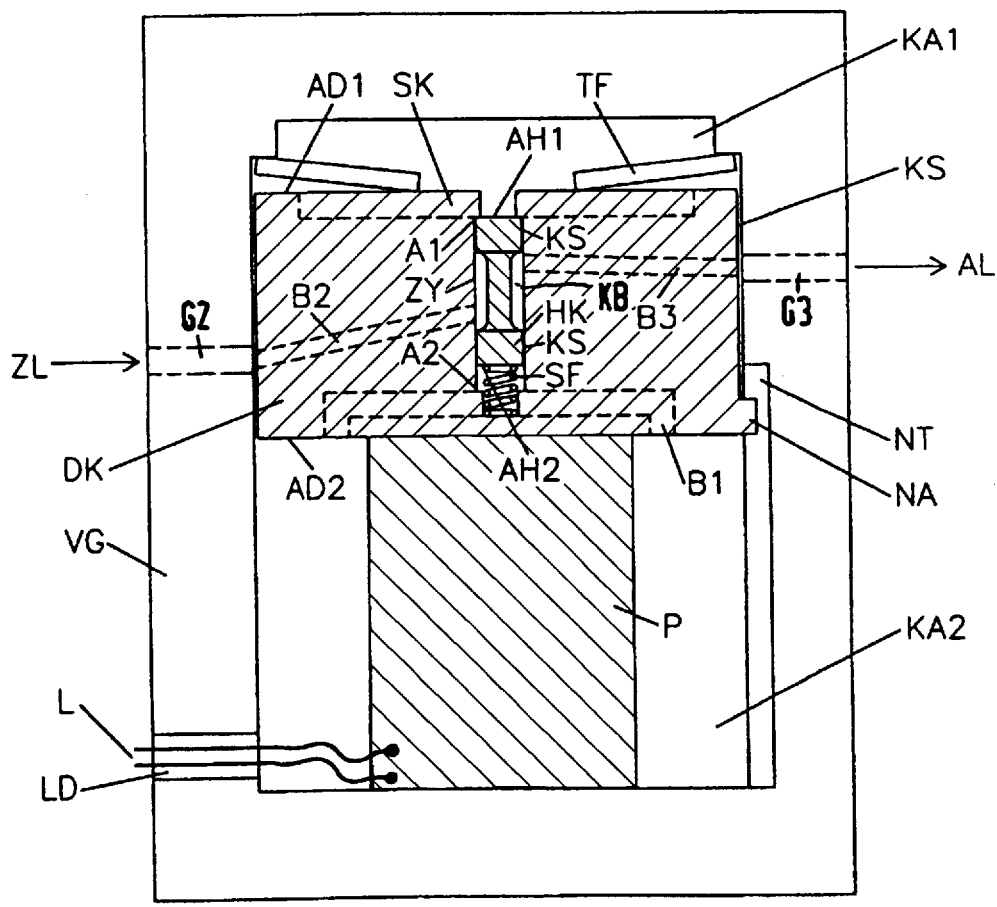
FIG. 2 is a schematic diagram which shows a stop valve with a pressure piston installed in a rotationally fixed manner.

The annular ducts RA and RZ can be dispensed with if the pressure piston DK is provided, for example, as shown in FIG. 2 with a nose or projection NA, if the latter is guided in a vertical groove NT of the valve housing VG and piston rotations about the vertical axis are thereby blocked, but axial displacements of the pressure piston DK are not impeded as a result (see FIG. 2). For the supply of fuel to the annular chamber KB, therefore, simple inflow and outflow bores G2 and G3 assigned to the pressure piston bore B2 and B3 are sufficient in the valve housing VG.

The shutoff valve according to the invention uses a hydraulic stroke transformer for transmitting the primary adjusting travel $\Delta l$ generated by the actuator P. This allows a compact rotationally symmetrical valve design, high and largely freely selectable transmission ratios and the transfer of high forces in the smallest possible space. By virtue of the small moved masses, the valve also has very good dynamic properties. If suitable hydraulic fluids are used, it is extremely operationally reliable and largely maintenance-free. Moreover, the hydraulic stroke transformer allows the integration of an adaptive tolerance compensation which makes the valve not susceptible to the drift phenomena caused by temperature, pressure, vibrations, etc.

In the shutoff valve according to the invention, the piezoelectric actuator P drives two coupled hydraulic stroke transformers, the transmission ratio $\eta 1$ of the upper stroke transformer being determined by $$\eta 1 := (AD1/AH1)$$

with

AD1: area of the top side of the pressure piston

AH1: area of the top side of the lifting piston. If the actuator P arranged in the chamber KA2 does not change its volume despite a length change of Δl, the transmission ratio η2 of the lower hydraulic stroke transformer is calculated correspondingly as $$\eta2:=(AD2/AH2)$$

with

AD2: area of the underside of the pressure piston

AH2: area of the underside of the lifting piston.

A behaviour which in a good approximation is volume-invariant during elongation is exhibited by piezoelectric, electrostrictive, magnetostrictive and electromagnetic actuators.

If the actuator P experiences a volume change ΔV proportional to the length change Δl, it can be assigned the actually effective actuator area AP:=(ΔV/Δl). In this case, the transmission ratio η2' of the lower stroke transformer is calculated as $$\eta2'=(AD2-AP)/AH2.$$

Ideally, the upper and the lower stroke transmission ratios should be identical (η1=η2=η), which can always be achieved by a corresponding design of the pressure-effective end faces of the two pistons DK and HK. Thus, for example, the pressure piston DK can be given a stepped design (AD1≠AD2), in order to compensate a volume effect of the actuator. On account of the compressibility of hydraulic media and the flexibility of the valve housing VG as well as the installed fittings (pressure piston DK, lifting piston HK), however, a restricted functioning of the drive is still provided even when η1 and η2 coincide only approximately.

The result of the hydraulic coupling of the two stroke transformers is that, during each length change of the actuator P, complementary pressures build up in the chambers KA1 and KA2/KA3, a displacement of the pressure DK by Δl bringing about an oppositely directed displacement of the lifting piston HK in the pressure piston bore ZY, the oppositely directed displacement being increased according to the hydraulic transmission ratio η>1.

In order to guarantee that the drive is essentially dependent on temperature, the hydraulic chambers KA1, KA2, KA3 are connected both to one another and, via the capillary gaps KS that are present in each case between the pistons DK and HK and the corresponding cylinder bores, to a compensating volume AV which is under high pressure. Temperature-related volume changes of the hydraulic fluid therefore cannot lead either to the formation of static pressure differences between the chambers KA1 and KA2/KA3 (this would result in undefined positions of the lifting piston HK), or to the formation of undefined pressure states in the system as a whole. Moreover the connection made with the compensating volume AV via the housing bore G1 has the advantage that no cavitation reducing the maximum actuation frequency occurs in the hydraulic fluid.

By adapting the flow resistances of the capillary gaps KS to the viscosity of the hydraulic fluid used, it is possible to ensure that the valve shuts off in the relevant working temperature range at the frequency predetermined by the activation signal and for the desired duration. In order to establish a high flow resistance, it is appropriate, for example, to provide the bore G1 in the region of the pressure piston sealing surface (see FIG. 7). However, in principle, it can also be made in any other region of the valve housing VG, insofar as flow resistances in the form of diaphragms, gaps, throttles, contractions SW (cf. FIG. 1), etc. ensure that only comparatively slow compensating processes can take place between the hydraulic fluid enclosed in the valve housing VG and that present in the compensating volume AV or between the fluids of the individual chambers KA1, KA2 and KA3. If appropriate, the various volumes or chambers are to be sealed off relative to one another to such an extent that the stop times required are achieved and the temperature independence of the drive is still guaranteed. A temperature-dependent control of the gap flows is possible if the valve housing VG and the installed fittings (pressure piston DK, lifting piston HK) are produced from materials having different coefficients of thermal volume/length expansion. It can thus be ensured that the gap widths decrease with increasing temperature, thereby increasing the flow resistance correspondingly. Temperature-controlled flow resistances can, of course, also be manufactured as discrete structural elements and be installed in the corresponding bores G3 or supply conduits.

The drive installed in the shutoff valve according to the invention has a series of advantages. Thus, the drive allows symmetrical cavitation-free switching with very short switching times, extremely short idle times and high actuation frequencies. Furthermore, by virtue of its simple and compact design and the wide working temperature range, the drive is distinguished by high operating reliability. The fact that the actuator P is arranged so as to be hermetically encapsulated in one of the hydraulic chambers KA2 also contributes to this. Good dissipation of the generated heat and optimum protection against environmental influences are therefore guaranteed. The drive is also largely closed off, since the electrical connections L of the actuator P are led outward through a pressure-tight, electrically insulating element LD.

It has hitherto been assumed that the hydraulic medium and the medium to be shut off are identical. For example, diesel fuel can be used as a hydraulic medium on account of its tribological properties, so that no seals are necessary in the region of the running surfaces of the pressure piston and of the lifting piston. The functions of the hydraulic accumulator AV can then assume a static pressure prevailing at the inflow ZL.

Such a static pressure likewise results, via the various capillary gaps, in a pressure prestress on the hydraulic medium, thus preventing cavitation. Moreover, the permanently prevailing static pressure makes it possible to compensate temperature-related volume changes of the hydraulic medium, thereby ensuring the temperature independence of the drive. In the event that the medium to be shut off and the hydraulic medium (for example diesel fuel) are identical, the hydraulic accumulator AV shown in FIG. 1 can therefore be dispensed with. However, by an additional sealing of the chambers and bore ducts, the maximum actuating duration can be lengthened, hydraulic rigidity increased and the pressure effect exerted on the valve housing and the installed fitting via the inflow ZL reduced.

Figure 3:
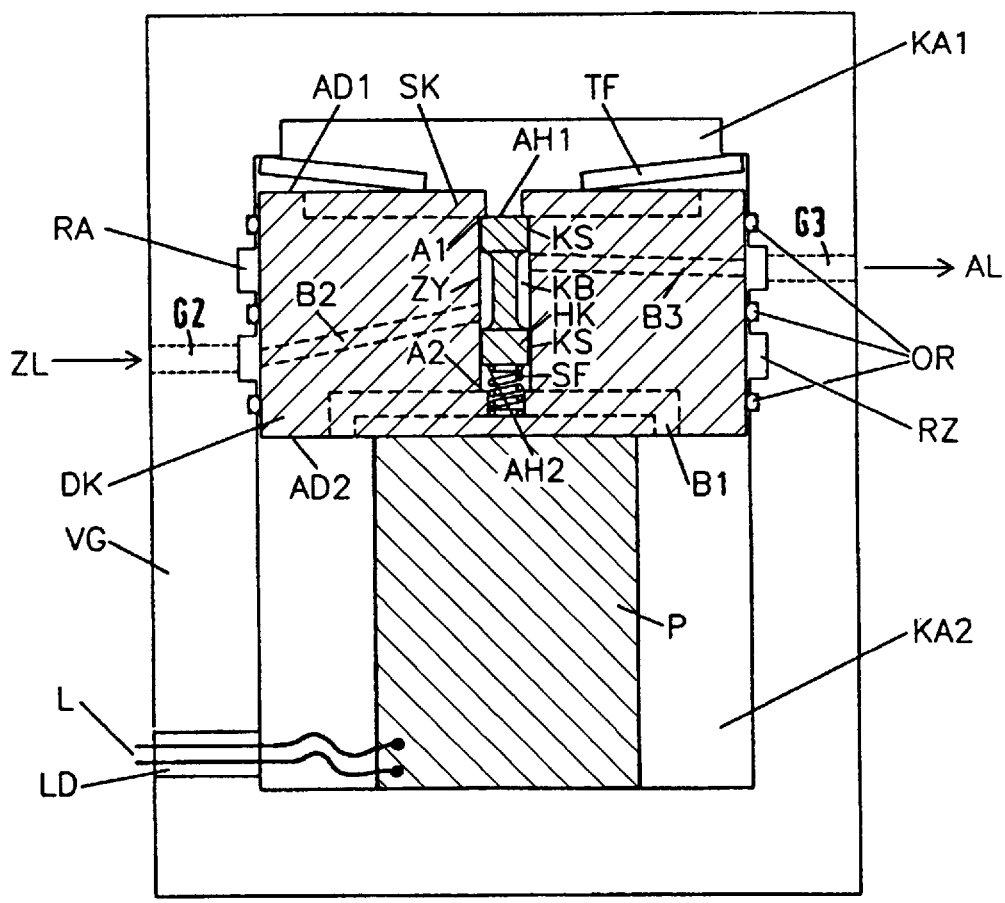
FIGS. 3 to 6 are schematic diagrams which show exemplary embodiments of stop or shutoff valves.
Figure 4:
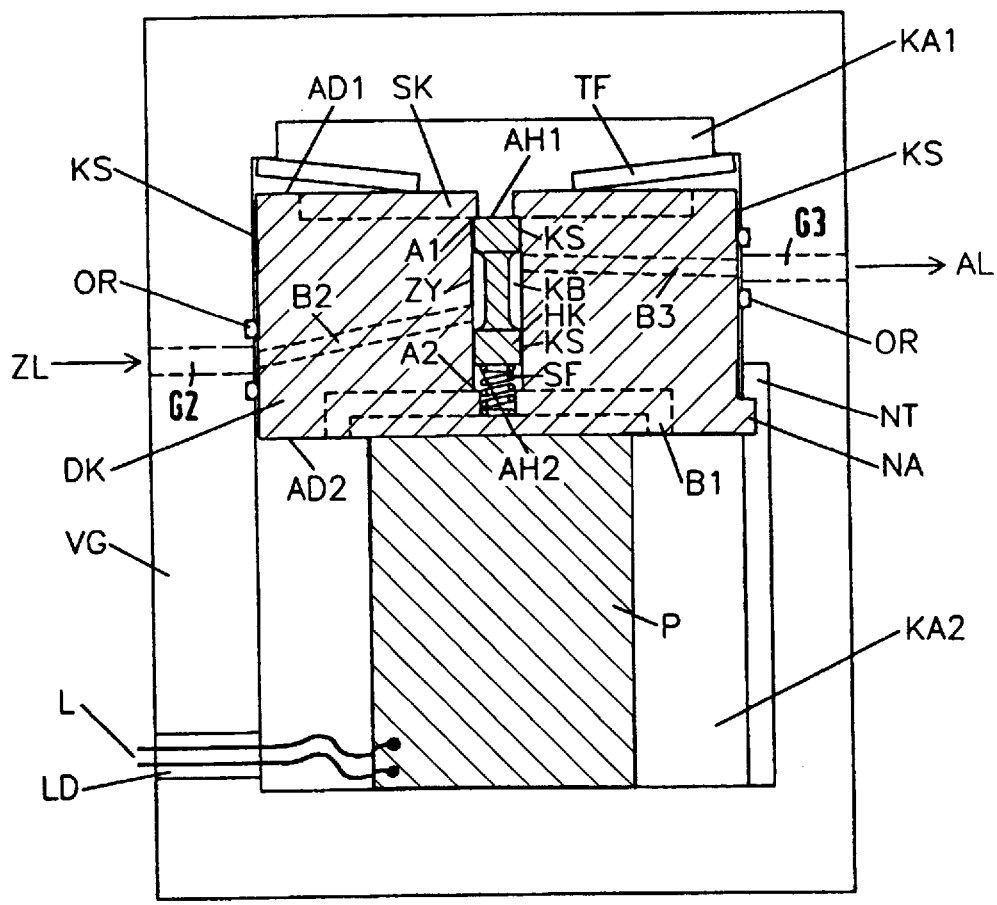

FIGS. 3 and 4 show stop valves with pressure pistons DK installed in a sealed manner in the housing VG. Since, in the exemplary embodiment according to FIG. 3, the pressure piston DK can rotate in the housing VG, the O-rings OR must seal off the hydraulic chambers KA1 and KA2 over the entire pressure piston circumference in relation to the annular ducts RA and RZ carrying the medium to be shut off.

The stop valve represented in FIG. 4 possesses a pressure piston (DK) installed in a rotationally fixed manner. In this case, sealing can be implemented by means of the two O-rings OR fitted in the region of the inflow and outflow bores G2/G3 of the housing VG. If the hydraulic medium and the medium to be shut off are not identical, an intermixing of the two media must be prevented by means of corresponding seals. This can be achieved in the way shown in FIG. 3 and FIG. 4 by sealing off the pressure piston DK and bore orifices and by means of additional sealing elements on the lifting piston HK. In this case, a specific hydraulic accumulator must be provided for the hydraulic medium.

Figure 5:
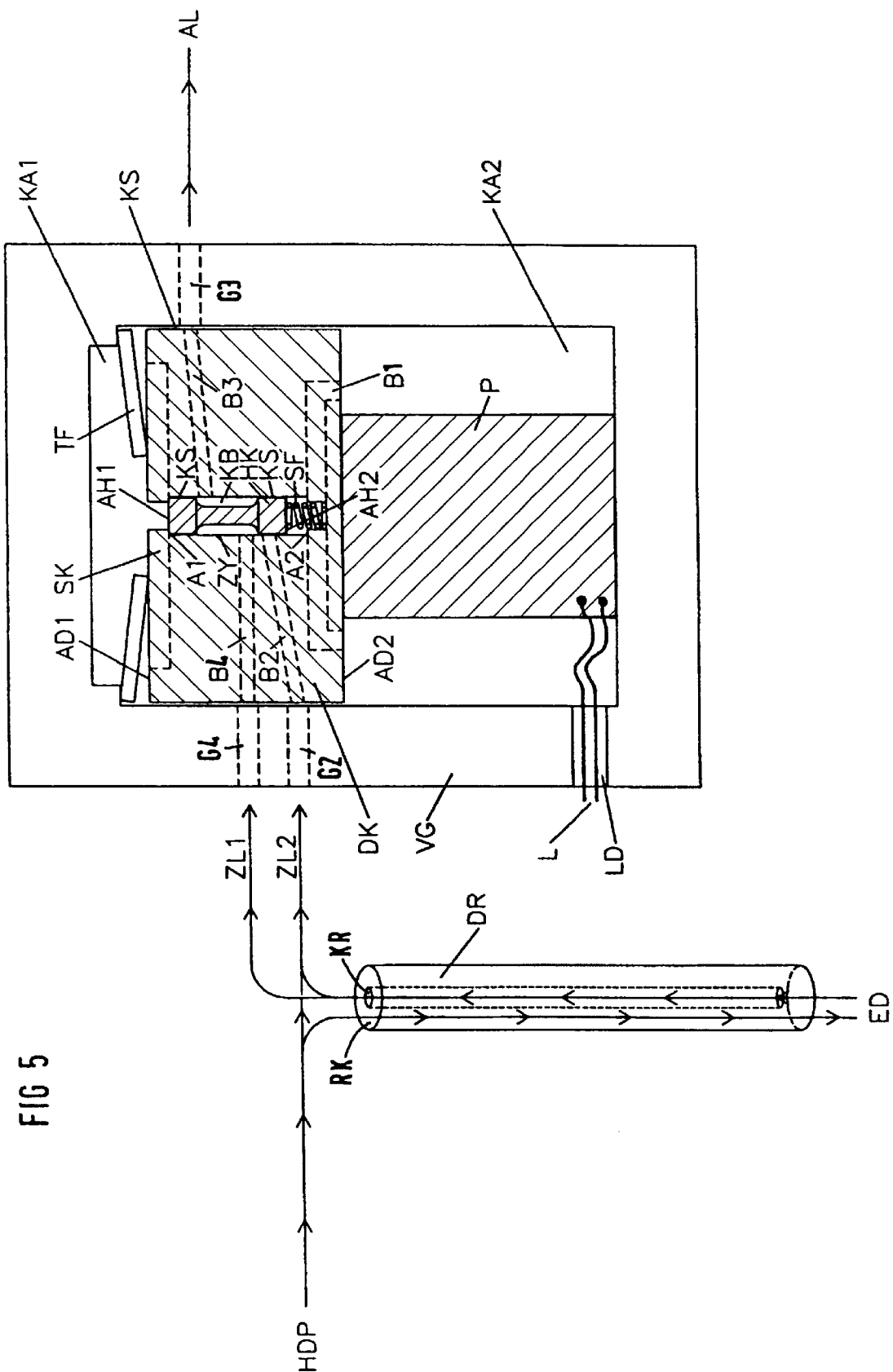

The lifting piston HK serving as a valve slide can also be used for opening and closing a plurality of pressure piston bores B2, B3, B4 opening into the chamber KB (see FIG. 5). Such a measure is expedient when the loss mechanisms caused by pressure gradients during the transient opening and closing of the valve are to be kept small and operating reliability is to be further increased. Here, the supply of shutoff fluid to the injection nozzle ED takes place via a delivery conduit DR designed as a coaxial hollow tube. Since the lower cylindrical part of the lifting piston HK closes the pressure piston bore B2 when the actuator P is not activated, the fluid fed by the high pressure pump HDP first flows through the outer annular duct RK of the delivery conduit DR as far as the injection nozzle ED, and from there via the core tube KR, the inflow ZL1, the housing bore G4 and the pressure piston duct B4 into the chamber KB, in order finally to flow back into the tank via the pressure piston duct B3, the housing bore G3 and the outflow AL. In this operating phase, the shutoff fluid scavenges the system along the entire conduit length, with the result that gas bubbles and impurities are effectively removed. As a result of the activation of the actuator P, the lifting piston HK moves downward, shuts off the outflow AL and at the same time exposes the pressure piston bore B2. The feed pump HDP thus simultaneously builds up the overpressure in the chamber KB, the piston bores B2 and B4, the annular duct RK and the core tube KR of the conduit DR, so that only very small pressure gradients occur in the pump-side part of the system.

Figure 6:
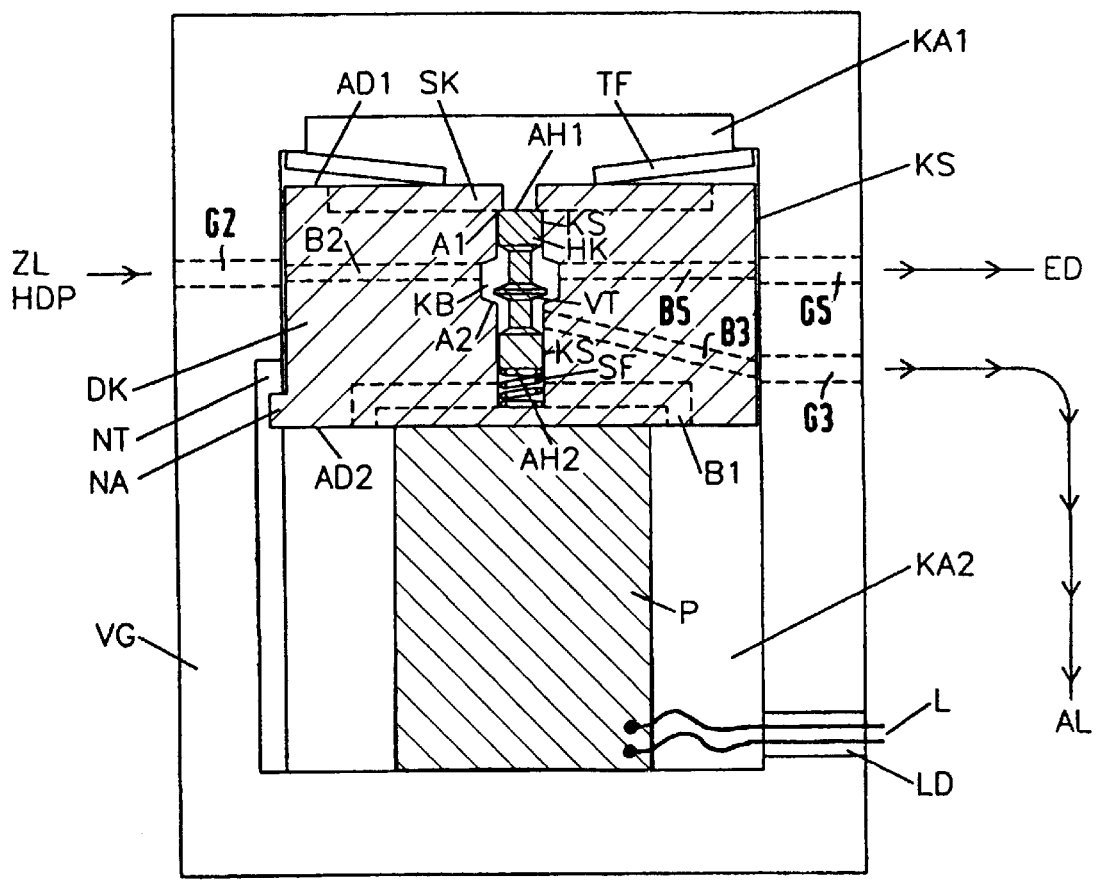

In the shutoff valve represented in FIG. 6, the middle part of the lifting piston HK, the middle part connecting the two cylindrical head pieces, is designed as a seat valve VT. In the nonactivated state, the fuel fed by the high pressure pump HDP flows via the inflow ZL, the housing bore G2 and the pressure piston bore B2 into the chamber KB and from there via the pressure piston bore B3, the housing bore G3 and the outflow AL back into the tank. In order to build up the necessary injection pressure in the chamber KB and in the bores B5, G5, connected to the nozzle ED, and supply conduits, the actuator P is activated and the lifting piston HK is thereby moved downward, so that, finally, the valve disk VT comes to rest on the abutment A2 and shuts off the outflow AL. When the actuator P is deactivated, the valve disk VT lifts off again from the abutment A2 designed as a sealing seat and the fuel can flow off via the bores B3 and G3. With the exposure of the outflow AL, the overpressure built up in the chamber KB also falls abruptly below the value critical for fuel injection and the injection valve ED closes.

Figure 7:
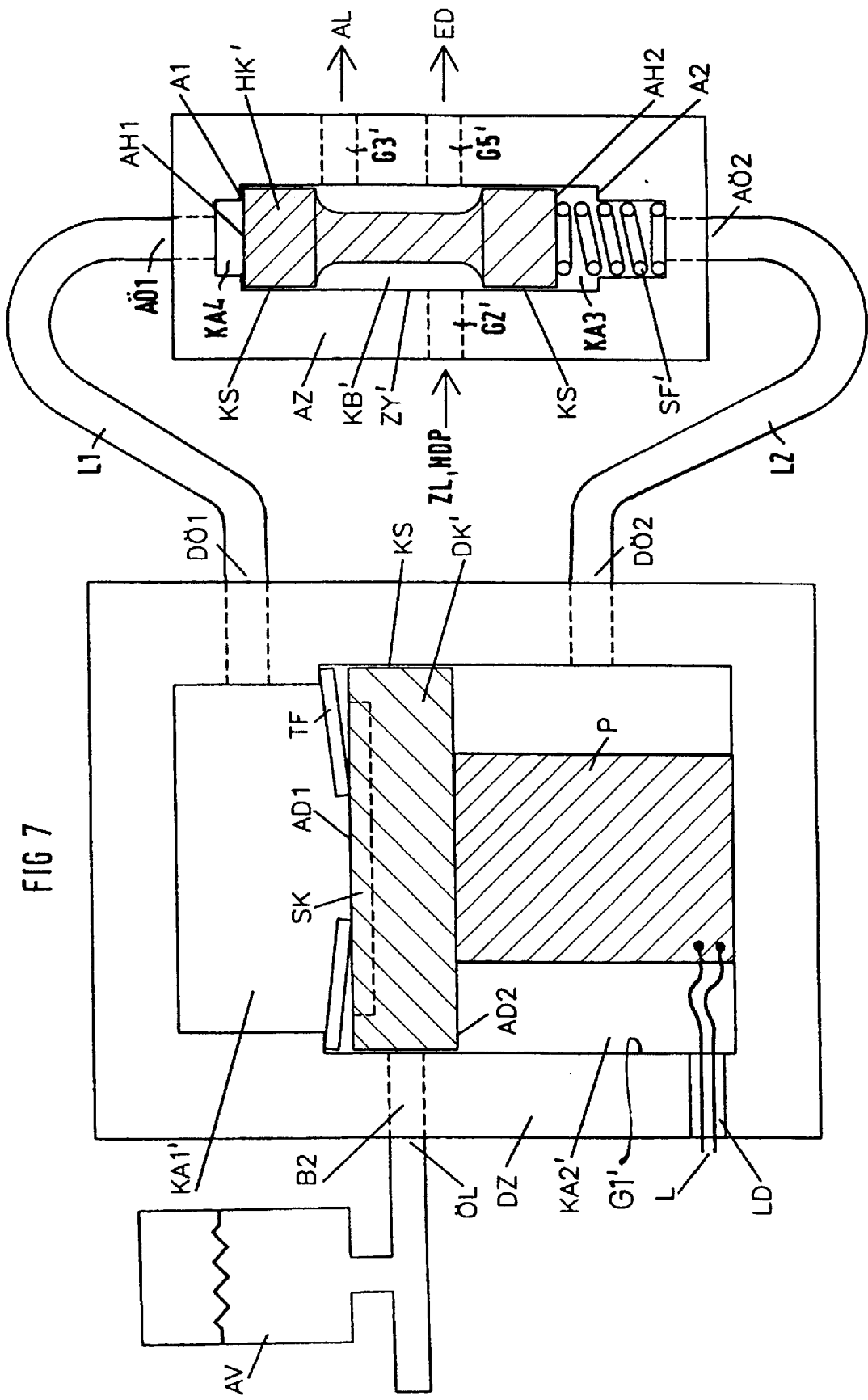
FIG. 7 shows a stop valve with separate pressure and working cylinders.

Possibilities for the universal use of stop or shutoff valves are afforded by the spatial separation of the pressure-generating elements from the components performing the stop function. As shown in FIG. 7, for this purpose, the upper and lower hydraulic chambers KA1/KA2 of a pressure cylinder DZ containing the actuator P, the piston DK and the cup spring TF are connected via bores DÖ1, DÖ2 and pipelines L1, L2 to corresponding bores AÖ1, AÖ2 in the walls of a working cylinder AZ receiving the dumbbell-shaped lifting piston HK and the closing spring SF. Since, in this exemplary embodiment too, the coupled stroke transformers have the same transmission ratio η1=η2 with η1=AD1/AH1 and η2=AD2/AH2, any length change of the actuator P leads to complementary pressures in the chambers KA1 and KA2 and the volumes KA4 and KA3 of the working cylinder AZ which are connected to said chambers. The housing bores G2, G5, G3 of the working cylinder AZ, which are assigned respectively to the high pressure feed pump HDP, to the injection nozzle ED and to the outflow AL, are made, here again, in such a way that the displacement of the lifting piston HK from the abutment A1 to the abutment A2, said displacement being brought about by an elongation of the actuator P, interrupts only the return flow of the fuel into the tank.

Figure 8:
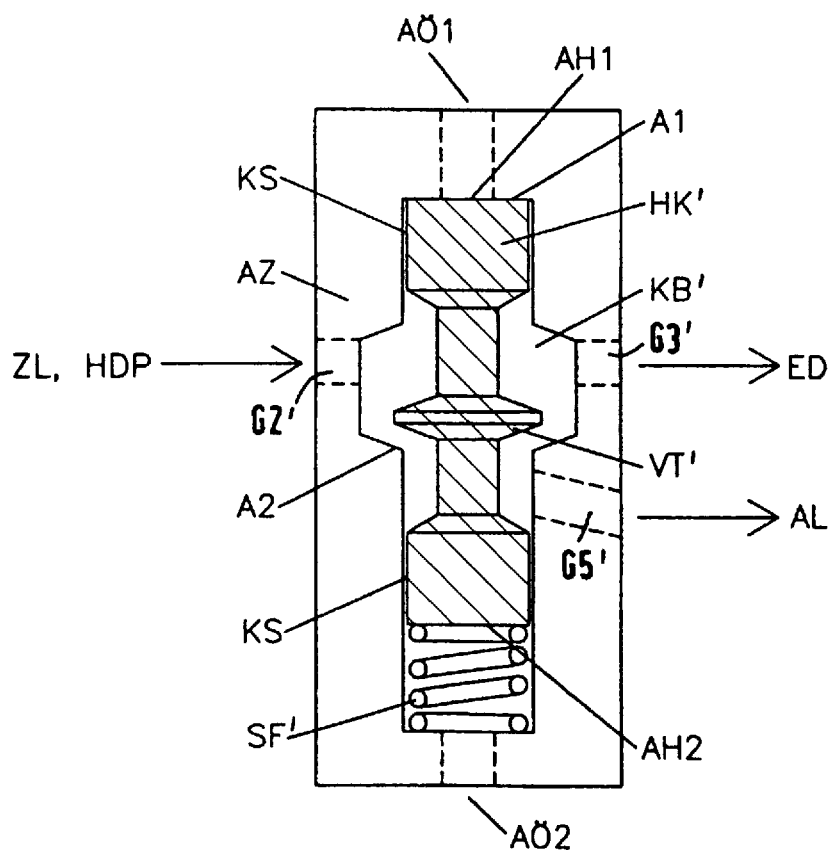
FIG. 8 is a schematic diagram which shows the working cylinder of a stop valve with a working piston designed as a seat valve.

FIG. 8 shows a working cylinder AZ with a lifting piston HK designed as a seat valve. In this exemplary embodiment too, the bores AÖ1 and AÖ2 are connected via hydraulic conduits L1 and L2 to the corresponding housing bores D Ö1, DÖ2 of the pressure cylinder DZ represented in FIG. 7. In the deactivated state, the fuel fed by the high pressure pump HDP flows via the inflow ZL, the housing bore G2, the chamber KB, the housing bore G5 and the outflow AL into the tank, so that no significant overpressure can build up in the system. In order to generate the necessary injection pressure in the chamber KB and in the conduit connected to the latter and leading to the nozzle ED, the actuator is elongated. The lifting piston HK thereupon moves downward away from the abutment A1 until the valve disk VT comes to rest on the sealing seat A2 and shuts off the outflow AL. The deactivation of the actuator P leads to the exposure of the outflow bore G5 and consequently to an abrupt pressure drop in the chamber KB, thus finally terminating the injection operation.

The invention is, of course, not restricted to the exemplary embodiments described. Thus, the stop function of the valves shown in FIGS. 1 to 4 is also guaranteed when, in the event of an elongation of the actuator P, the lifting piston HK shuts off both the pressure piston bore B2 serving as an inflow and the bore B3 serving as an outflow or only the bore B2.

If the hydraulic medium and the medium to be shut off are identical, then, as explained above, the pressure accumulator AV can be dispensed with and the housing bore G2 can be connected to a delivery connection of the feed pump HDP or to the inflow ZL.

It is, of course, also possible to activate a plurality of the working cylinders AZ shown in FIGS. 7 and 8 by means of a single pressure cylinder DZ.

Although other modifications and changes may be suggested by those skilled in the art, it is the intention of the inventors to embody within the patent warranted hereon all changes and modifications as reasonably and properly come within the scope of their contribution to the art.

We claim:

1. A stop device, comprising:
 a) a first piston arranged axially displaceably in a first bore of a first housing,
   a1) the first piston and the first bore forming a first and a second housing chamber, and
   a2) the first and the second housing chamber each being filled with a hydraulic medium;
 b) an actuator, which is arranged in one of the first and second housing chambers and an axial length of which can be changed controllably, is connected to act on the first piston;

c) a dumbbell-shaped second piston is arranged axially displaceably in a second bore of the first piston,
   c1) the dumbbell-shaped second piston acting on a return element arranged in the first housing,
   c2) the second piston and the second bore forming a third chamber filled with the hydraulic medium, and
   c3) the third chamber being connected to the second housing chamber;
d) the second piston and the second bore form a stop chamber, the stop chamber
   d1) being connected via a first piston duct to a housing inflow and via a second piston duct to a housing outflow, and
   d2) the first and the second piston duct opening into the stop chamber in such a way that the second piston shuts off one of the first and second piston ducts in an event of a length change in the actuator.

2. A stop device as claimed in claim 1, wherein the first housing has a first and a second annular duct in a region of a side face of the first piston, and the first annular duct connects the first piston duct to the housing inflow and the second annular duct connects the second piston duct to the housing outflow.

3. A stop device as claimed in claim 1, wherein the first piston is arranged in the first housing in a rotationally fixed manner.

4. A stop device as claimed in claim 1, further comprising: means defining a third piston duct connected to a second housing outflow and opening into the stop chamber in such a way that said third piston duct is not shut off in an event of a displacement of the second piston.

5. A stop device as claimed in claim 1, further comprising: means defining a fourth piston duct opening into the stop chamber and connected to a second housing inflow.

6. A stop device as claimed in claim 1, wherein the first housing inflow is connected to a pressure-generating feed device.

7. A stop device as claimed in claim 1, wherein the housing inflow and the housing outflow are at different levels.

8. A stop device as claimed in claim 1, wherein the second housing outflow is connected to an injection device.

9. A stop device as claimed in claim 1, wherein the second piston is a sealing valve.

10. A stop device as claimed in claim 1, wherein end faces of the second piston are each smaller than corresponding end faces of the first piston.

11. A stop device as claimed in claim 1, wherein a capillary gap is present between side faces of at least one of the first and of the second piston and a respective one of the bores.

12. A stop device as claimed in claim 1, further comprising: a spring element acting on the first piston.

13. A stop device as claimed in claim 1, wherein at least one of the first and second piston are installed in a sealed manner.

14. A stop device as claimed in claim 1, wherein said actuator is one of a piezoelectric, electrostrictive, magnetostrictive and electromagnetic actuator.

15. A stop device as claimed in claim 1, wherein at least one of the housing chambers is connected to a pressure accumulator. the actuator.

16. A stop device, comprisinga:
a) a first piston arranged axially displaceably in a first bore of a first housing,
   a1) the first piston and the first bore forming a first and a second housing chamber, and
   a2) the first and the second housing chamber each being filled with a hydraulic medium;
b) an actuator, which is arranged in one of the first and second housing chambers and an axial length of which can be changed controllably, being connected to act on the first piston;
c) a dumbbell-shaped second piston is arranged axially displaceably in a second bore of a second housing,
   c1) the second piston and the second bore forming a third and fourth housing chamber each filled with the hydraulic medium, and
   c2) the second piston acting on a return element arranged in the second housing;
d) the housing chambers being connected to one another in such a way that an axial displacement of the first piston causes a displacement of the second piston;
e) the second piston and the second bore form a stop chamber;
f) a housing inflow and a housing outflow open into the stop chamber in such a way that the second piston shuts off the housing inflow or the housing outflow in an event of a length change of the actuator.

17. A stop device as claimed in claim 6, further comprising: a second housing outflow opening into the stop chamber in such a way that said second housing outflow remains open in an event of displacement of the second piston.

* * * * *